US00RE48884E

(19) United States
(12) Reissued Patent
Samikkannu et al.

(10) Patent Number: US RE48,884 E
(45) Date of Reissued Patent: Jan. 11, 2022

(54) TABLE

(71) Applicant: AMTAB MANUFACTURING CORPORATION, Bensenville, IL (US)

(72) Inventors: Doss Samikkannu, Des Plaines, IL (US); Jeremias C. Rivera, Jr., Elmhurst, IL (US)

(73) Assignee: AMTAB MANUFACTURING CORPORATION, Bensenville, IL (US)

(21) Appl. No.: 29/725,014

(22) Filed: Feb. 21, 2020

Related U.S. Patent Documents

Reissue of:
(64) Patent No.: Des. 832,604
Issued: Nov. 6, 2018
Appl. No.: 29/611,895
Filed: Jul. 26, 2017

(51) LOC (13) Cl. ..... 06-01
(52) U.S. Cl.
USPC ..... D6/337
(58) Field of Classification Search
USPC ..... D6/334, 335, 336, 337, 338, 340, 342, D6/650

(Continued)

(56) References Cited

U.S. PATENT DOCUMENTS

D209,758 S * 1/1968 Blink et al. ..... D6/337
D211,886 S * 8/1968 Benjamin ..... D6/337

(Continued)

OTHER PUBLICATIONS

U.S. Appl. No. 29/611,895, filed Jul. 26, 2017.
AmTab Manufacturing Corporation, AmTab American Tables—Since 1958, Mobile Table catalog, 2016, pp. 3, 6, 8 and 9.

*Primary Examiner* — Philip S Hyder

(74) *Attorney, Agent, or Firm* — Barnes & Thornburg LLP

(57) CLAIM

The ornamental design for a table[with stool seating], as shown and described.

DESCRIPTION

*This is a reissue application of U.S. Design Pat. No. D. 832,604, issued on Nov. 6, 2018, which is hereby incorporated by reference in its entirety.*

FIG. 1 is a perspective view of a table [with stool seating] depicting *an embodiment of* the new design;
FIG. 2 is a front elevational view of the table depicted in FIG. 1;
FIG. 3 is a rear elevational view of the table depicted in FIG. 1;
FIG. 4 is a left side elevational view of the table depicted in FIG. 1;
FIG. 5 is a right side elevational view of the table depicted in FIG. 1;
FIG. 6 is a top plan view of the table depicted in FIG. 1; [and,]
FIG. 7 is a bottom plan view of the table depicted in FIG. 1[.];
*FIG. 8 is a perspective view of a table depicting another embodiment of the new design;*
*FIG. 9 is a front elevational view of the table depicted in FIG. 8;*
*FIG. 10 is a rear elevational view of the table depicted in FIG. 8;*
*FIG. 11 is a left side elevational view of the table depicted in FIG. 8;*
*FIG. 12 is a right side elevational view of the table depicted in FIG. 8;*
*FIG. 13 is a top plan view of the table depicted in FIG. 8; and,*
*FIG. 14 is a bottom plan view of the table depicted in FIG. 8.*

(Continued)

(NEW)

The broken lines [showing] *depict* portions of the table [frame are for the purpose of illustrating portions of the table with stool seating] that form no part of the claimed design.

1 Claim, 10 Drawing Sheets

Figure 1:
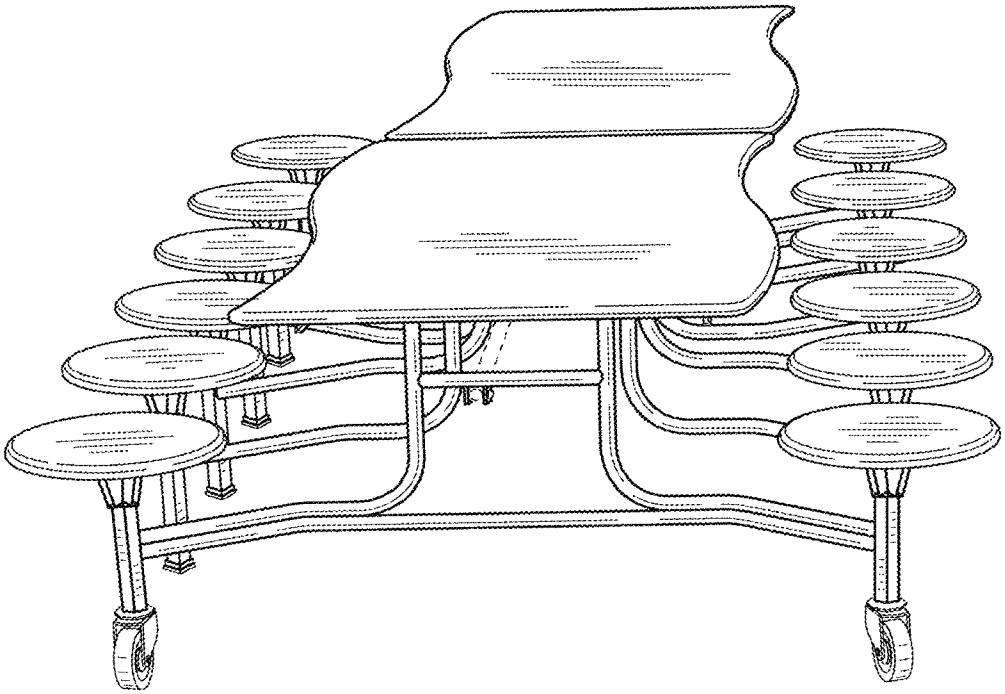
Figure 2:
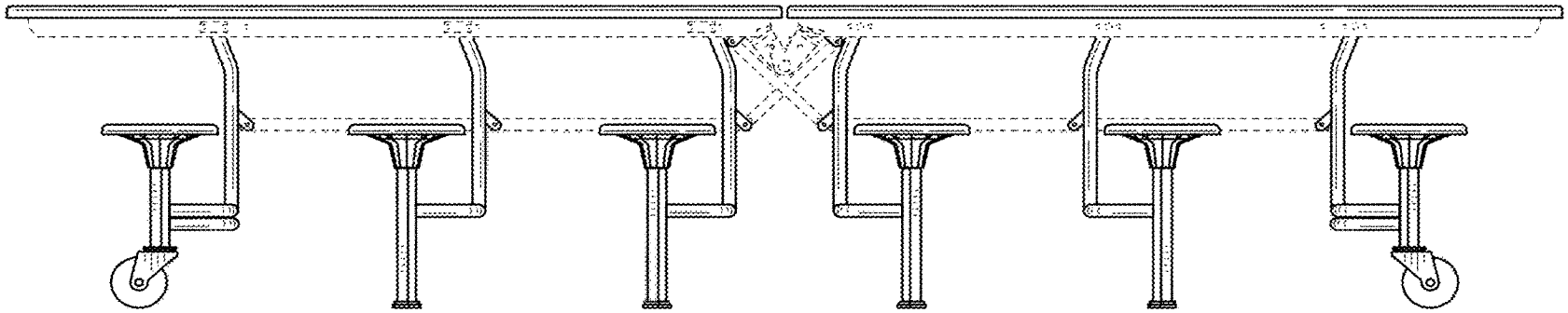
Figure 3:
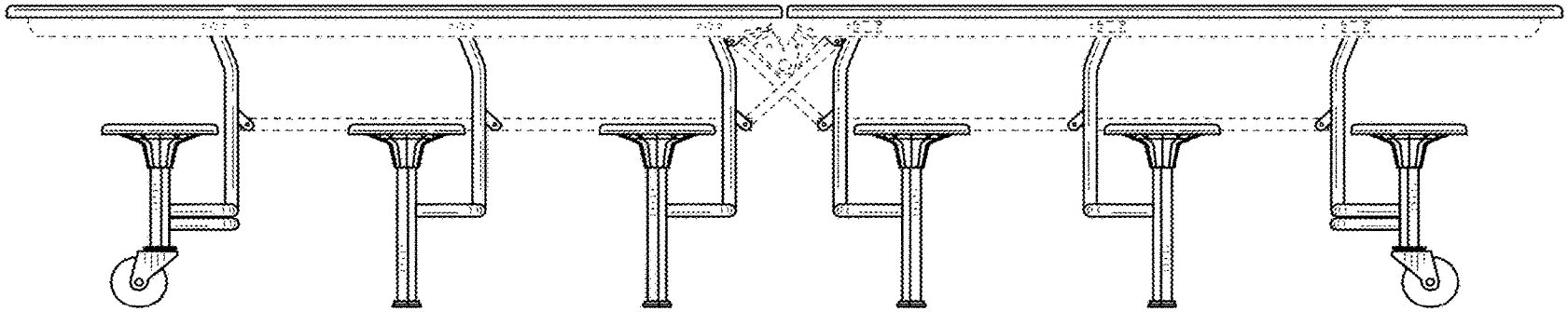
Figure 5:
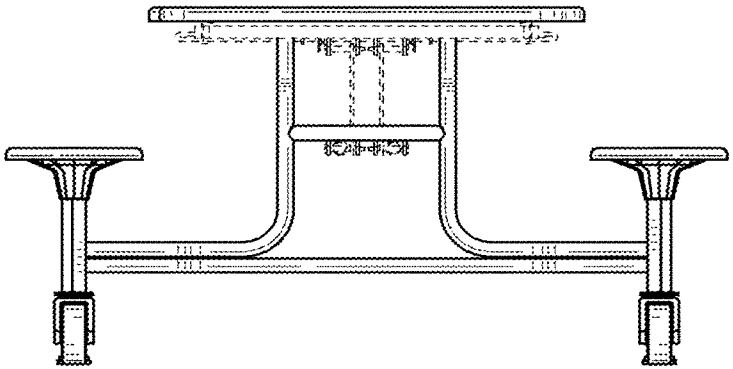
Figure 4:
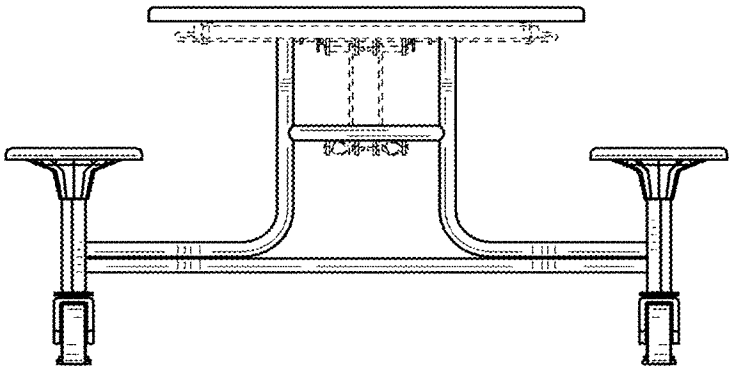
Figure 6:
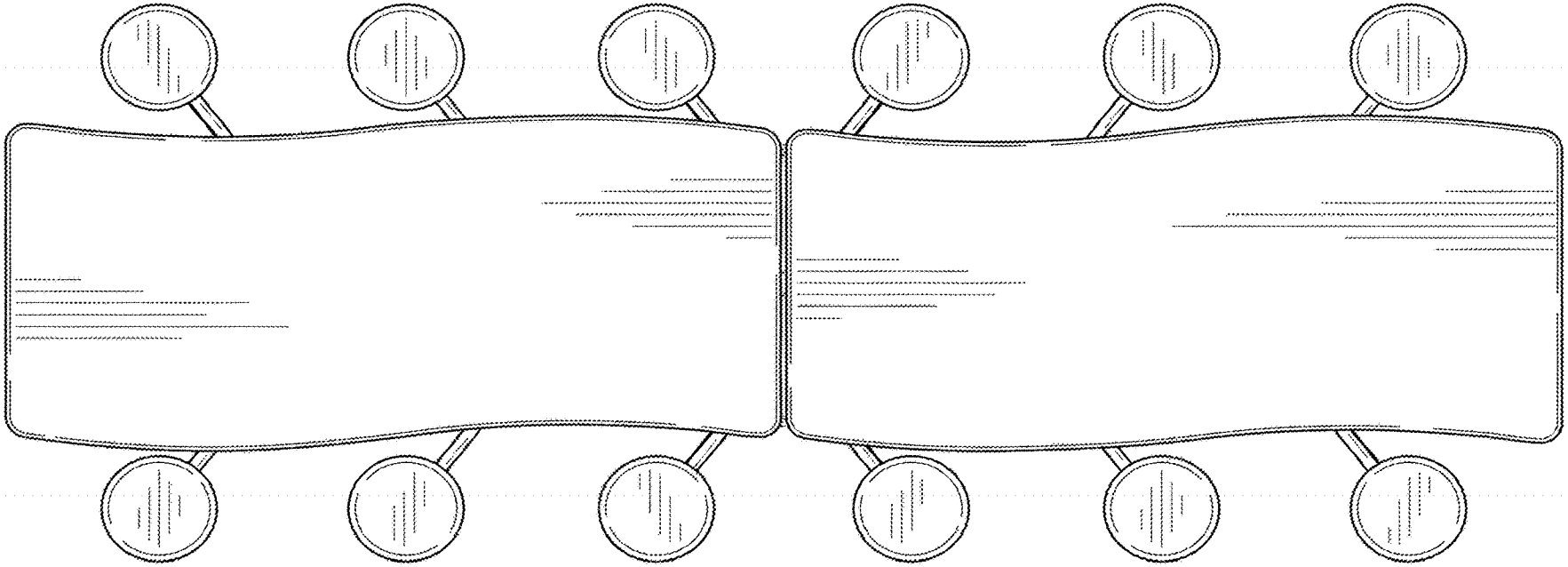
Figure 7:
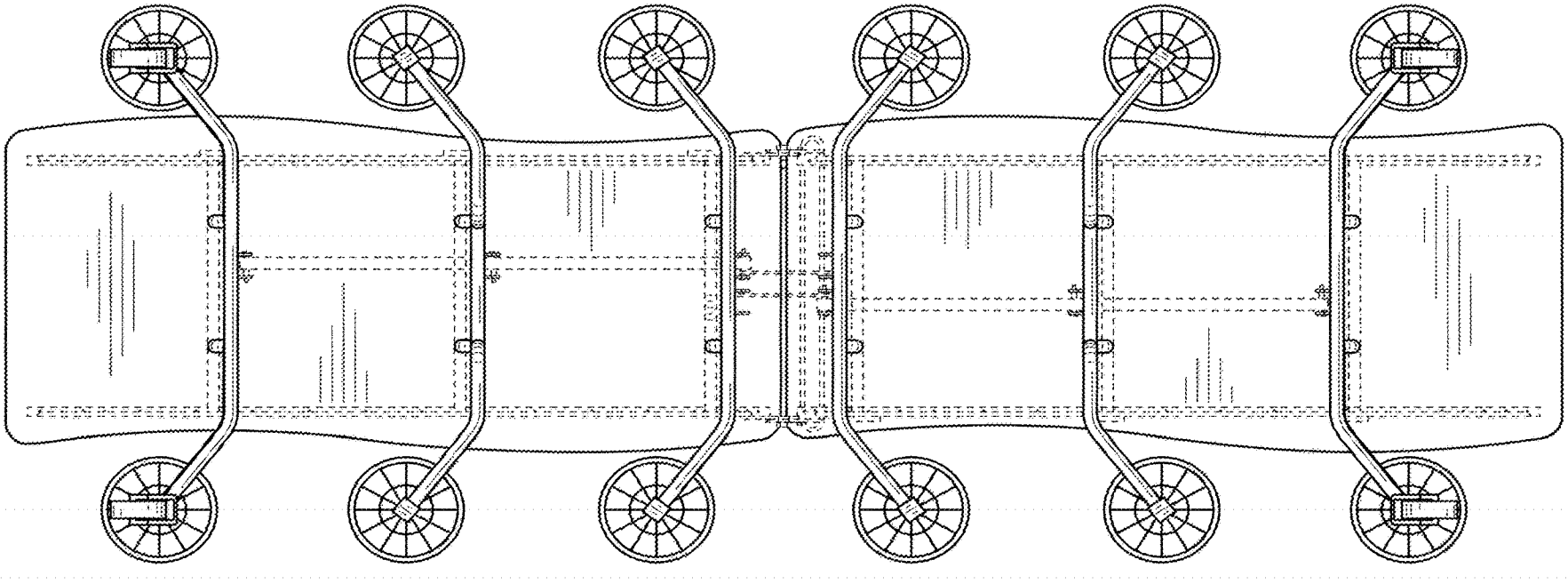

Matter enclosed in heavy brackets [ ] appears in the original patent but forms no part of this reissue; matter printed in italics indicates the additions made by reissue.

(58) Field of Classification Search
CPC ..... A47B 3/14; A47B 3/002; A47B 3/083; A47B 3/087; A47B 2003/145; A47B 83/02
See application file for complete search history.

(56) References Cited

U.S. PATENT DOCUMENTS

| | | | | | |
|---|---|---|---|---|---|
| D327,779 | S | * | 7/1992 | Jensen | D6/337 |
| D390,381 | S | * | 2/1998 | Dormon | D6/650 |
| D413,734 | S | * | 9/1999 | Bue | D6/337 |
| D417,094 | S | | 11/1999 | Schwartz | |
| 6,065,802 | A | * | 5/2000 | Bue | A47B 3/14 108/168 |
| D439,060 | S | * | 3/2001 | Larsen | D6/337 |
| 6,223,661 | B1 | * | 5/2001 | Griepentrog | A47B 3/14 108/115 |
| 6,347,831 | B1 | * | 2/2002 | Nye | A47B 3/14 297/118 |
| D456,155 | S | * | 4/2002 | DeVriendt | D6/337 |
| 6,363,866 | B1 | * | 4/2002 | Schwartz | A47B 13/10 108/64 |
| D478,732 | S | * | 8/2003 | Pajerski | D6/337 |
| D514,830 | S | * | 2/2006 | Bue | D6/337 |
| D527,209 | S | | 8/2006 | Nicoletti | |
| 7,171,911 | B1 | * | 2/2007 | Rivera, Jr. | A47B 3/14 108/115 |
| D546,097 | S | | 7/2007 | Glass | |
| D559,580 | S | | 1/2008 | Newhouse | |
| D571,566 | S | * | 6/2008 | Patel | D6/337 |
| D572,505 | S | | 7/2008 | Davis | |
| D573,360 | S | * | 7/2008 | Bue | D6/337 |
| D604,522 | S | * | 11/2009 | Wegman | D6/338 |
| 7,611,193 | B2 | * | 11/2009 | Bue | A47C 9/022 297/141 |
| D637,826 | S | * | 5/2011 | DeVriendt | D6/338 |
| D639,572 | S | * | 6/2011 | Frobose | D6/338 |
| D659,327 | S | | 5/2012 | Davis | |
| 8,181,583 | B2 | | 5/2012 | Rivera, Jr. et al. | |
| 8,205,937 | B2 | | 6/2012 | Rivera, Jr. et al. | |
| D670,089 | S | * | 11/2012 | Frobose | D6/338 |
| 8,479,667 | B2 | | 7/2013 | Rivera, Jr. et al. | |
| 9,101,218 | B2 | * | 8/2015 | Bradley | A47B 3/14 |
| D752,316 | S | | 3/2016 | Gil | |
| D781,629 | S | * | 3/2017 | Handler | D6/707.22 |
| D793,136 | S | | 8/2017 | Grano | |
| D802,945 | S | * | 11/2017 | Rivera, Jr. | D6/337 |
| D846,925 | S | | 4/2019 | Handler | |
| 2002/0161984 | A1 | * | 10/2002 | Lloyd-Jones | G06F 12/0238 711/203 |
| 2005/0161984 | A1 | * | 7/2005 | Bue | A47B 3/087 297/158.4 |
| 2012/0013152 | A1 | * | 1/2012 | Bradley | A47B 3/14 297/135 |
| 2017/0245632 | A1 | * | 8/2017 | Dickey | A47B 3/087 |

* cited by examiner

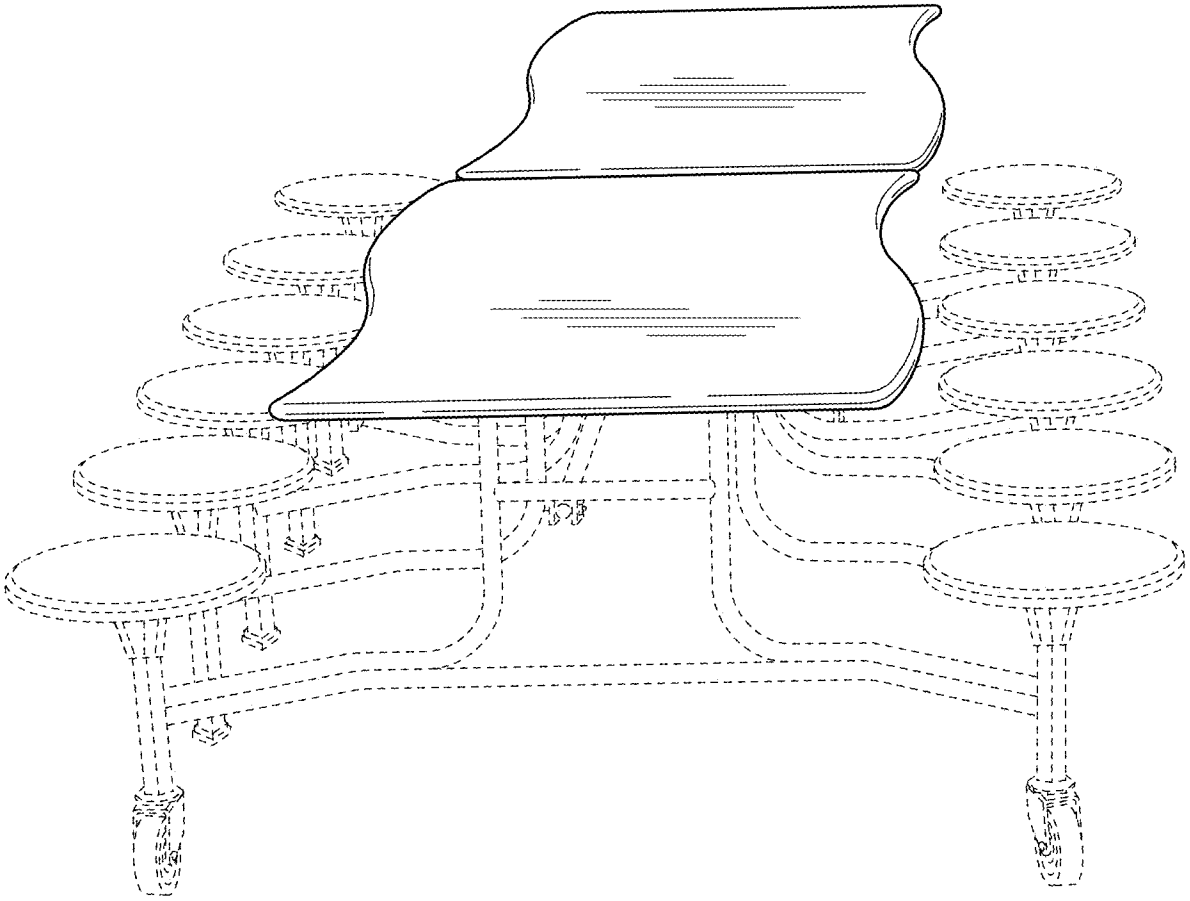
FIG. 8 (NEW)

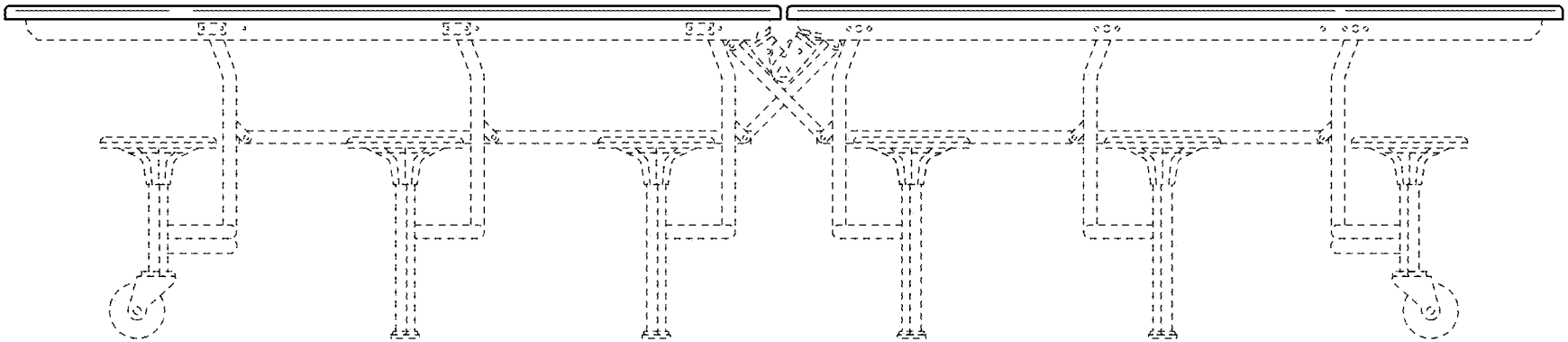
FIG. 9 (NEW)
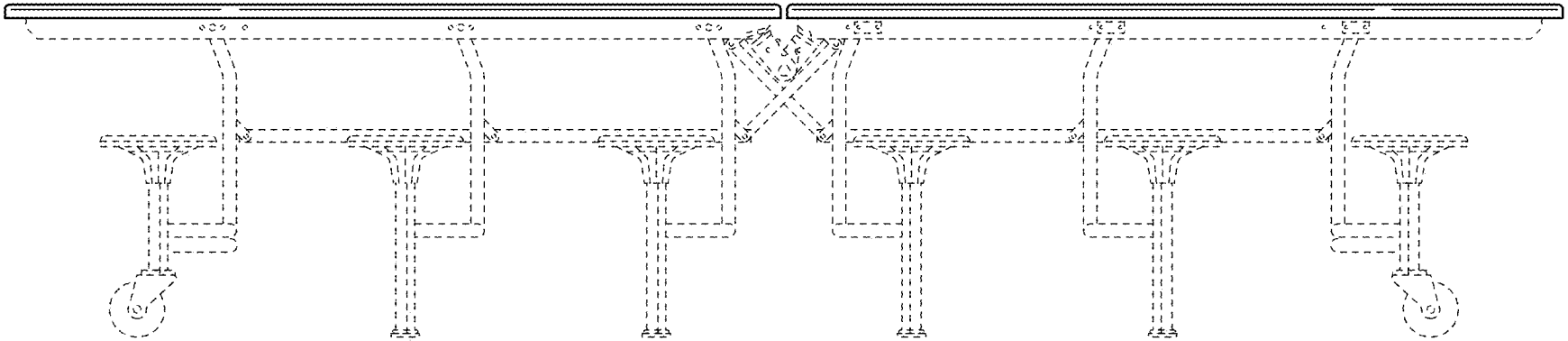
FIG. 10 (NEW)

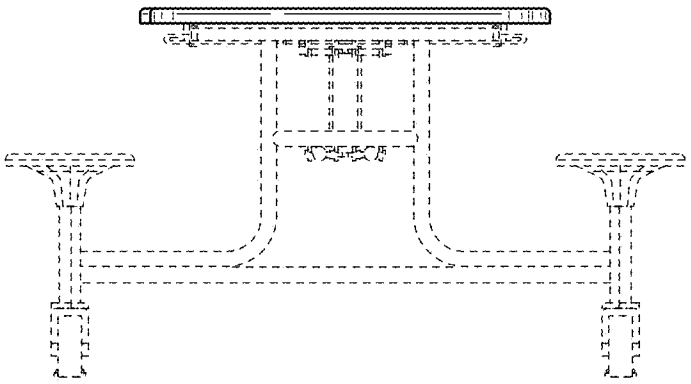
FIG. 12 (NEW)
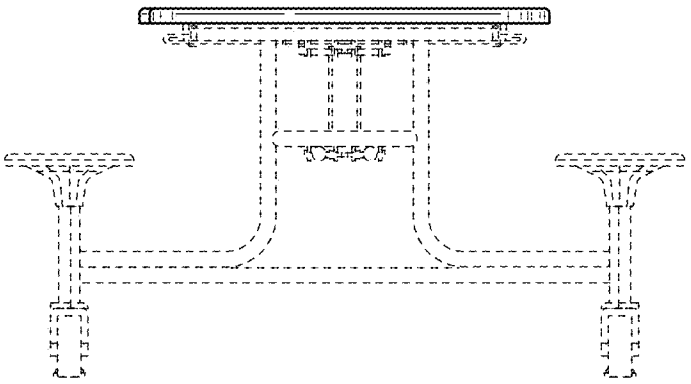
FIG. 11 (NEW)

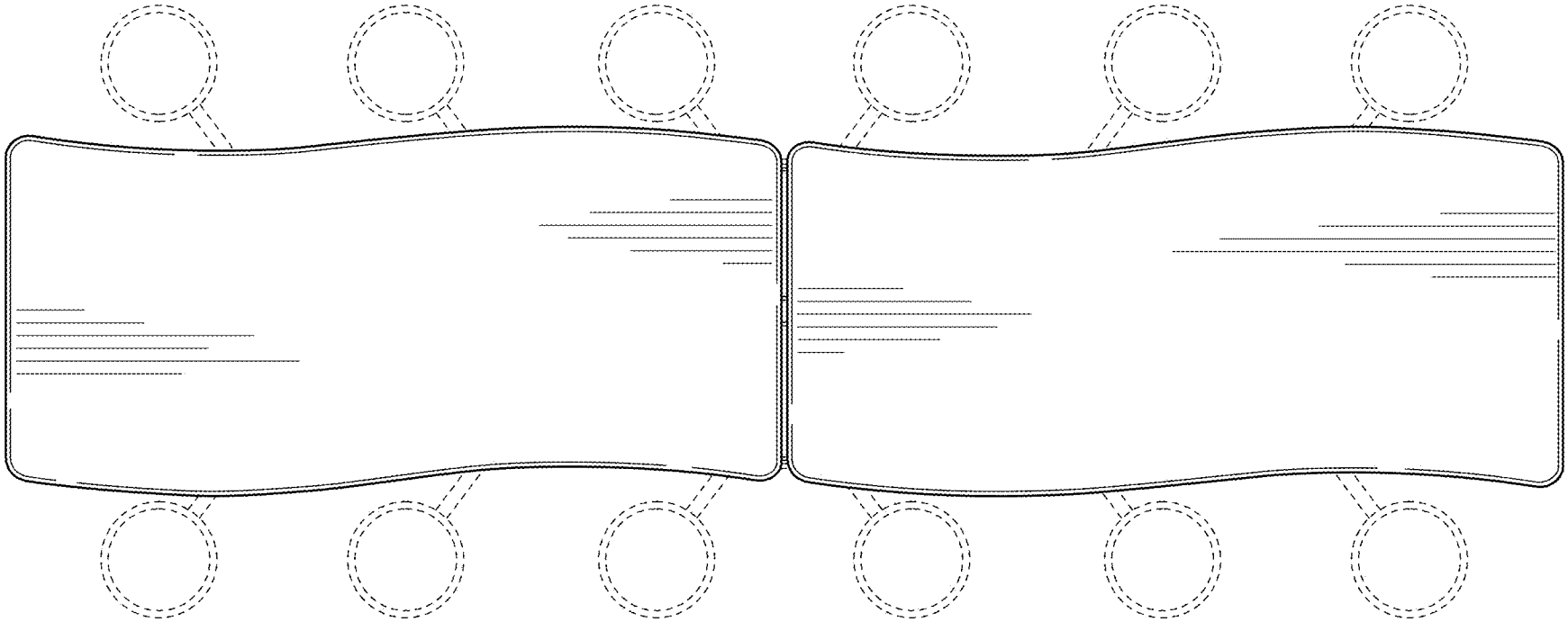
FIG. 13 (NEW)

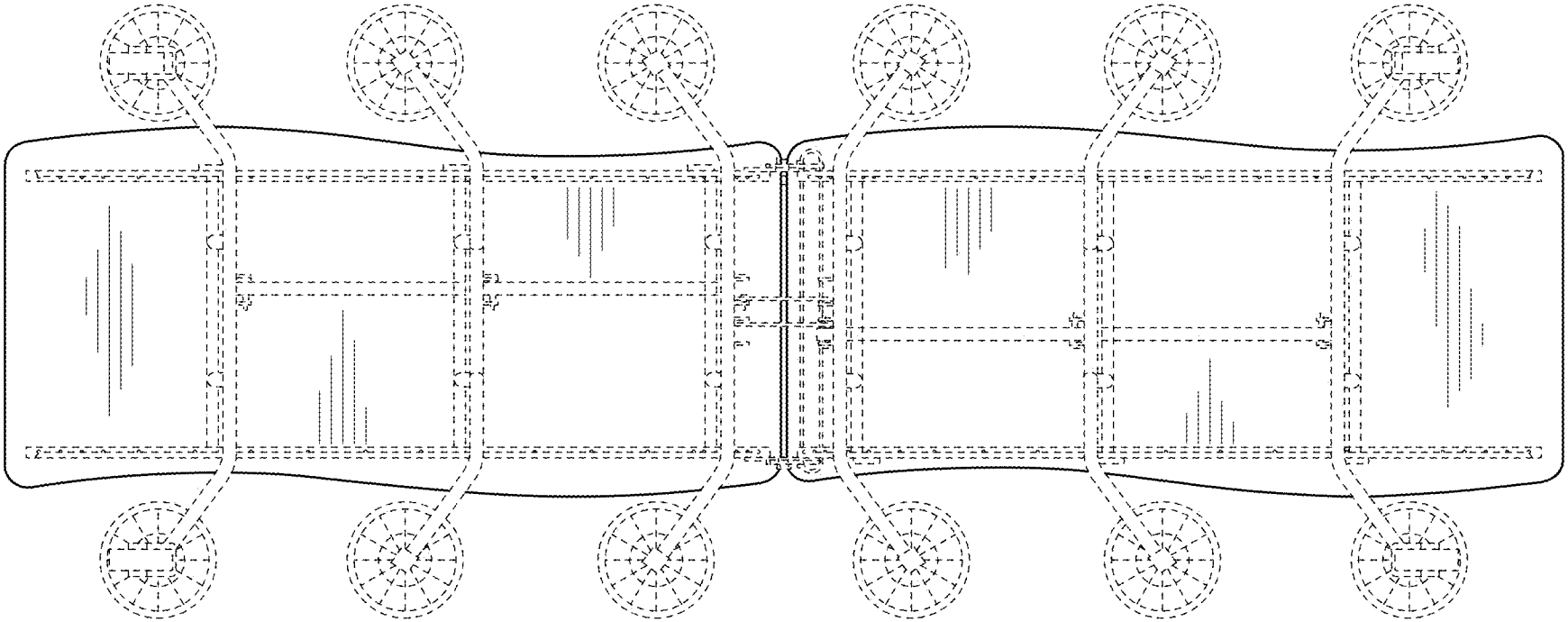
FIG. 14 (NEW)